B. J. BROWNJOHN & T. J. DENNY.
SLIDING AND SWINGING SASH WINDOW
APPLICATION FILED JULY 25, 1912.
1,092,473.
Patented Apr. 7, 1914.
2 SHEETS—SHEET 1.
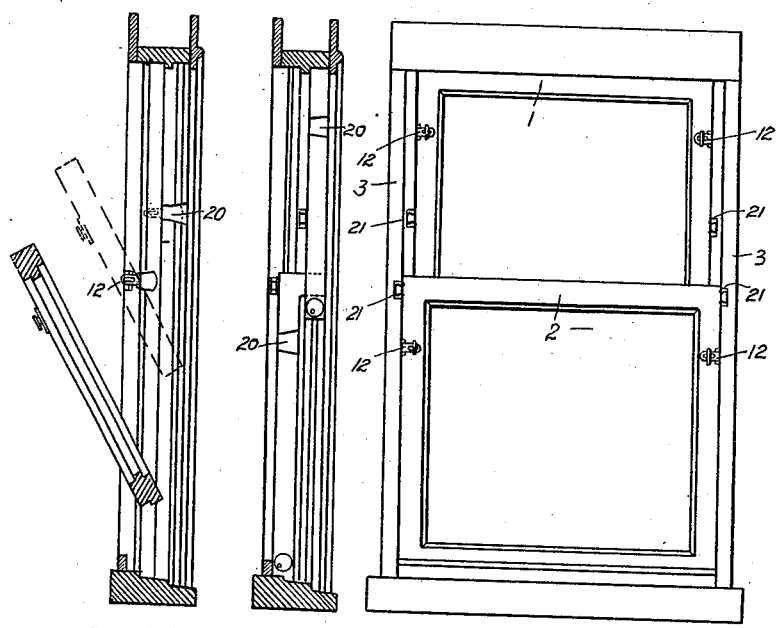
FIG.2  FIG.3  FIG.1
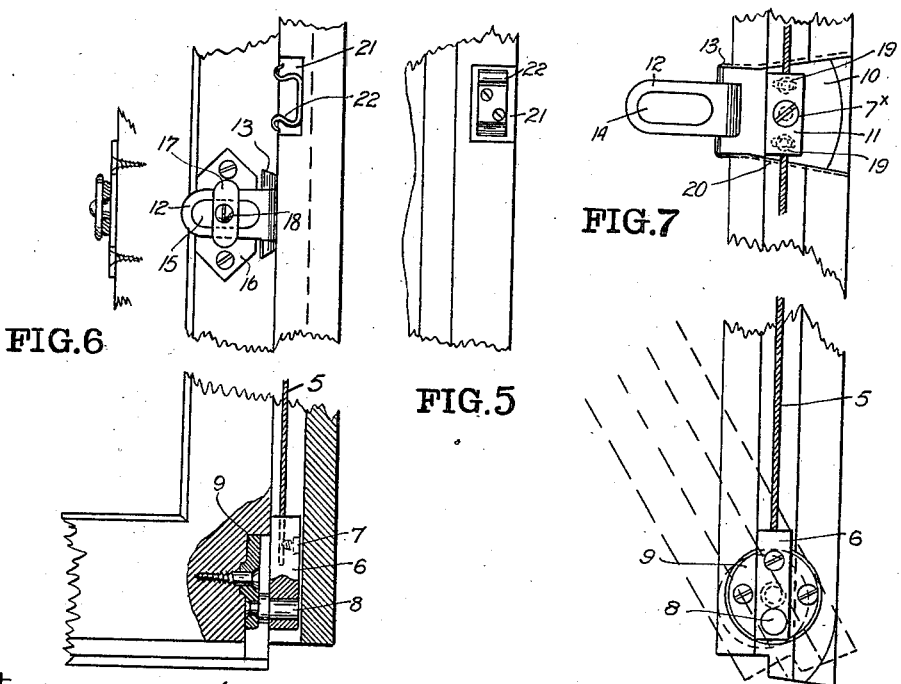

B. J. BROWNJOHN & T. J. DENNY.
SLIDING AND SWINGING SASH WINDOW.
APPLICATION FILED JULY 25, 1912.
1,092,473.
Patented Apr. 7, 1914.
2 SHEETS—SHEET 2.
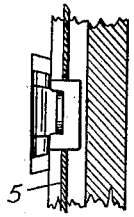
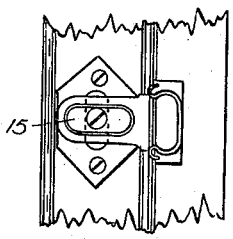
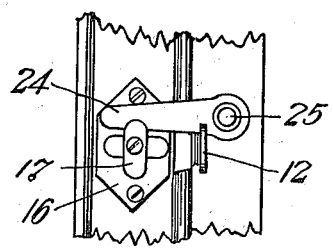
FIG. 9  FIG. 11
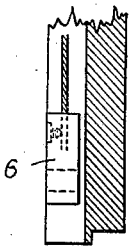
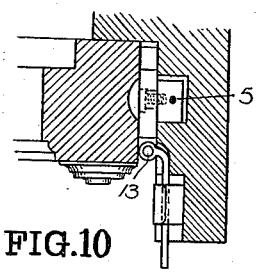
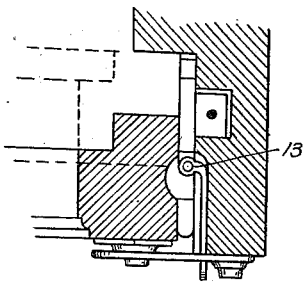
FIG. 8  FIG. 10
FIG. 12
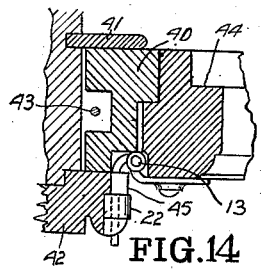
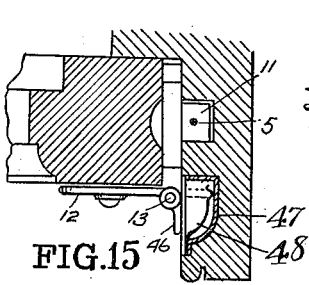
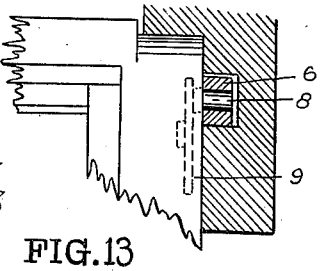
FIG. 14  FIG. 15
FIG. 13
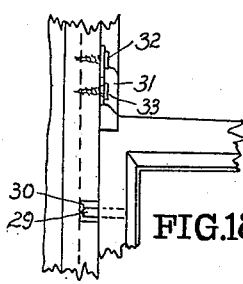
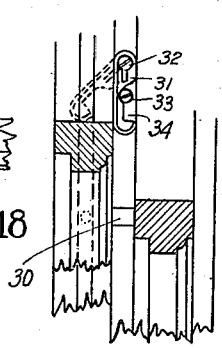
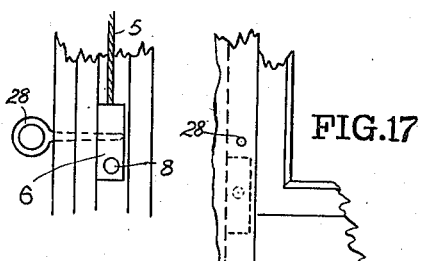
FIG. 18
FIG. 16
FIG. 17
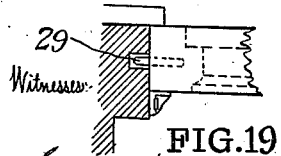
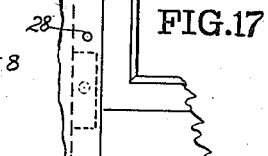
FIG. 19  FIG. 20
Witnesses
Eugene Wening
[signature]
Inventors
Benjamin Joseph Brownjohn
Thomas James Denny
by Otto Munk
their Attorney
COLUMBIA PLANOGRAPH CO., WASHINGTON, D. C.

UNITED STATES PATENT OFFICE.

BENJAMIN JOSEPH BROWNJOHN, OF PETERSHAM, NEAR SYDNEY, AND THOMAS JAMES DENNY, OF SYDNEY, NEW SOUTH WALES, AUSTRALIA.

SLIDING AND SWINGING SASH WINDOW.

1,092,473.

Specification of Letters Patent.

Patented Apr. 7, 1914.

Application filed July 25, 1912. Serial No. 711,445.

*To all whom it may concern:*

Be it known that we, BENJAMIN JOSEPH BROWNJOHN and THOMAS JAMES DENNY, subjects of the King of Great Britain and Ireland, residing, respectively, at 22 Weston street, Petersham, near Sydney, New South Wales, Australia, and 56–58 Hunter street, Sydney aforesaid, have invented certain new and useful Improvements in Sliding and Swinging Sash Windows, of which the following is a specification.

Our invention relates to windows of the class in which vertically sliding counterweighted sashes are mounted in the frame in such a manner that they may be folded or swung inward on horizontal pivot supports in order to make their outer sides accessible from the interior of the room.

The sashes are suspended by cords—one on either side of each of them—running over sheaves in the frame jambs and carrying counterweights. These cords are each attached to "hanging" slippers which are carried by trunnion pins projecting from the sides of the sash stiles near the lower ends thereof; the hanging slippers run in vertical grooves in the frame jambs. "Locking" slippers are also fixed to the cords at points thereon near the upper ends of the sash stiles; catch-plates on the backs of these locking slippers set withdrawably into dovetailed recesses in the sash stiles; the slippers work in the jamb grooves and they are provided with folding lock staples which normally engage the sash stiles and secure the slippers thereto, but in one certain predetermined position are engageable with the frame jamb when freed from the sash.

The present invention includes an accessory device for holding the sashes in a slightly open inswung position to permit ventilation without raising the sashes from the closed sliding position.

Ordinarily the slippers are mounted as beforementioned on the sash stiles and the sashes slide vertically between the frame jambs, the slippers maintaining their correct alinement. In an alternative construction the sash stiles are divided vertically and the divided stiles slide as one piece in the frame, but the divided slip remains held between the frame stops while the sash proper is being swung or folded inward.

In the accompanying drawings: Figure 1 is a front elevation of a sliding sash window to which our invention is applied; Fig. 2 and 3 transverse vertical sections through same; Fig. 4 broken fragment front sectional elevation of portion of the sash and the frame jamb exhibiting one of the trunnions in one of the hanging slippers; Fig. 5 fragment vertical section on enlarged scale of portion of window frame exhibiting spring catch for holding the folding staples; Fig. 6 detail sectional elevation of slipper staple latch on the sash stile; Fig. 7 broken sectional elevation of side of sash stile showing the two slippers and the manner of fixing them to the sash stile and attaching them to the counterweight cords; Fig. 8 transverse vertical sectional elevation of the frame jamb showing the slippers and counterweight cord; Fig. 9 elevational view showing the slipper staple in latching and unlatching position, the staple being shown set for latching to the sash stile; Fig. 10 horizontal sectional elevation showing the slipper staple latched back to the frame jamb and the sash free to be folded inward about the trunnions in the hanging slipper; Fig. 11 elevational view showing clip holding sash slightly infolded to permit ventilation; Fig. 12 horizontal section corresponding with Fig. 11; Fig. 13 sectional plan showing hanging slipper in jamb groove and showing heel of stile rounded to give turning clearance for infolding; Fig. 14 horizontal sectional plan through one of the divided sash stiles and the frame jamb; Fig. 15 horizontal sectional plan showing alternative form of locking slipper, staple, and sunk pocket and clip spring for same in the face of the frame; Figs. 16 to 20 illustrate alternative and accessory devices; Fig. 16 being a fragment elevation showing hanging slipper in frame jamb groove, said slipper being made with a hole pierced transversely through it to carry a lock spike; Fig. 17 is a fragment elevational view corresponding with Fig. 16 explanatory of the position of the hanging slipper when the sash is lowered; Figs. 18, 19 and 20 are respectively fragment elevation, horizontal section, and transverse vertical section of sash and frame, explanatory of the construction and working of the keeper slide for retaining the lower sash in sliding position in the frame.

1 is the upper sash, 2 the lower sash, 3 frame jambs. The frame jambs are rabbeted or formed in two parts, the outer portion to accommodate the upper sash being of less width than the inner portion which accommodates the lower sash. This difference in widths is shown in Fig. 1 and is also shown in Figs. 10, 12 and 15. A pair of sheaves is provided in the frame jambs 3 for each of the sashes, and over these sheaves, which are placed near the upper part of the jambs as in ordinary construction, the sash cords 5 work. The lower ends of these cords are secured in hanging slippers 6, Figs. 4, 7 and 8, by means of pinching screws 7. These slippers are pivotally carried on offset trunnion pins 8 projecting from plates 9 screwed to the sides of the sash stiles near the bottom ends thereof. The offset pins 8 are mounted eccentrically on the plates 9 in order to permit adjustment of their position transversely in relation to the sash by rotating the plate 9; these pins 8 are always set so as to make a neat sliding fit whereby the slipper 6 will be caused to bear against the front face of the jamb groove and the sashes caused to make a neat sliding fit against the frame rabbet, rattling being thus prevented. Each of the cords 5 has secured to it by pinching screws 7× at a point near the upper part of the sash stile to which it belongs, a catch plate 10 which carries a slipper 11, and a folding staple 12. The slipper 11 is attached to the catch plate 10 by two screws 19 in slotted holes, to permit transverse adjustment of the slippers relatively to the sash thereby to keep the sash pressed over against the frame rabbet to make a neat sliding fit therewith and prevent rattling. The center of the pintle 13 which carries the staple 12 is set slightly rearward of the face of the sash, in order that the staple 12 which is elbowed, will set neatly over the face of the stile and into the jamb recess 21, in the latter case so as to give easy clearance for the infolding of the sash past it. This elbowing of the staple prohibits the opening of it except when in register position with the jamb recess 21 and so insures that the sash may be infolded only when brought to the one predetermined position in the frame. The staple 12 is slotted as shown at 14 to take over the nob or enlargement 15 on the escutcheon plate 16 which is screwed to the face of the sash stile.

17 is a turn button mounted on pivot pin 18 for locking the staple 12 to the escutcheon nob 15 as best indicated in Figs. 4, 6 and 9. The slipper 11 on the catch plate 10 is secured to the cord 5 by pinching screws 19 in such a position thereon that the catch plate 10 will register with the dovetail transverse slot 20 in the side of the sash stile. The transverse slot 20 is dovetailed as shown in Figs. 3 and 7 so that the catch plate 10 will be firmly locked in it when it is pushed home and the staple 12 secured by the button 17. In this position of the parts the ropes 5 in effect hang the sashes from the catch plates 10. The locking slippers 11 and the hanging slippers 6 are slidable vertically in grooves in the stile jambs as shown in Figs. 8, 10, 12, 13, 14 and 15. The frame jambs are recessed as shown at 21, Figs. 4 and 5, and spring clips 22 are set in these recesses. These spring clips are adapted to loosely hold the staples 12 when same are folded outward and snap into them in the manner shown in Fig. 10. The recesses 21 are cut at that predetermined position in the frame jamb which will permit the opening of the staple 12 where necessary to permit the sashes to be swung inward, the inward swinging movement being indicated in Figs. 2 and 7.

The supplementary fitting shown in Fig. 11 consists of a fall over bracket arm 24 carried on a pivot screw 25 fixed in the frame jamb, and adapted to engage and hold the staple 12 in the outset position. The outer end of the arm 24 sets over the escutcheon plate 16 on the lower sash and is secured by the turn button 17 in the manner shown in Figs. 11 and 12, the lower sash being thus held swung inward slightly as shown in Fig. 12 to allow ventilation space between its top rail and the bottom rail of the upper sash.

In the arrangement shown in Fig. 14 in which the sash stiles are split, the rabbeted slip 40 slides between frame stops 41 and 42, and the counterweight cord 43 is fixed directly to the slip 40. The lower ends of the sash stiles 44 are pivotally mounted in the slip 40 by means of an offset pin such as 8 which in the other constructions takes into a hole in the "hanging" slipper 6. The "locking" slippers are used to secure the sash stiles 44 to the slips 40 and to engage said slips to the frame at a predetermined position by the setting of the staples 12 back into recesses 45 cut in the inner stops 42, clip springs 22 being provided to hold the staples open.

The elbow form of the staple 12 (Figs. 10, 12, and 14) is not essential provided that the staple is formed in such a way that it cannot be turned to the open position to free the sash except when the sash is brought to that position in the frame in which the staple is in register with a recess 21 in the frame. The staple may be formed for instance with a tail piece 46 as shown in Fig. 15, its pintle being then located flush with the face of the sash stile instead of as in Figs. 10, 12 and 14 rearward of it. A neat finish is secured by fitting a metal pocket 47 in a recess in the overhanging part of the jamb to receive the tail piece 56 when the staple is in the outset position. A clip spring 48 is fitted in the pocket 47 to hold the staple open as shown in Fig. 15.

The invention is characterized by the double attachment of the sash to the counterweight cord at two points, the upper one of said attachments being disengageable from the sash and engageable to the frame when, and only when, the sash is in one certain predetermined position in the frame. The alinement of the sash in the frame is secured by slippers which are attached to the cords and work in grooves in the frame jambs, and the immovable position of the pivots on which the sash may be infolded is secured by the engagement of the attachment before referred to with the frame, whereby the cords are locked to the frame.

While the locking slipper is engaged to the frame the cords are immovable and the counter pull of the sash weights is taken directly on the frame through the staples 12; while it is engaged to the sash the sash is freely slidable in the frame. The locking slipper therefore performs a treble function—it holds the sash in the sliding position locking it in the frame against folding movement; it fixes the position of the horizontal points about which the sash may be folded; and it transfers the pull of the counterweights directly to the frame when it is no longer necessary to counterbalance the sash. In addition it enables the correct setting of the sash relatively to the frame rabbet to insure neat fitting. The set screws provided for regulating and fixing the relative positions of the slippers on the cords and the position of these slippers relatively to the sash facilitate neat working adjustment and fitting of the parts.

In the alternative arrangement shown in Figs. 16 and 17, a hole is bored transversely through the lower slipper 6 and into this hole a pin key or spike 28 may be passed through a hole bored through the frame jamb. The pin 29 offset from the side of each sash stile is alinable with a slot 30 cut through the frame jamb into the vertical groove therein. A sliding keeper 31 is hung to either frame jamb by a screw pin 32, 33 being a check pin which takes into the jaw 34 of said keeper. These keepers act as stops to hold the sashes normally in working position in the frame, but when the keepers are moved upwardly and the offset pins 29 on the sash stiles are in register with the frame slots 30 the sashes may be swung inward through the frame on their pivotal supports 8 in the slippers 6, said slippers being meantime fixed immovably relatively to the frame by inserting the key pins or lock spikes 28. In replacing the sashes into the sliding position in the frame the keepers 31 are pushed inward by the upper rail of the sash as shown in dotted lines in Fig. 20 and the keepers are then slid upwardly on the upper pin 32 and dropped back into normal position (Fig. 20) in which position as already stated they act as stops behind which the sashes may slide vertically in the frame. Inward folding movement of the sashes is permitted only when they are brought to the clearance position in which the slide pins 29 which work in the jamb grooves register with the jamb slots 30 and the top rail of the sash comes to proper position relatively to the keeper 31. This arrangement is in practice used when the two sashes are counterbalanced the one by the other; but obviously it is usable also when the sashes are counterbalanced independently of each other by means of sash weights.

The operation is as follows: Referring to Figs. 1 to 10 the staples 12 being folded over the escutcheons 16 and locked by the turn buttons 17, the sashes are secured to the catch plate 10 and to the cords 5 which are fixed to the slippers 11 pinned to said catch plate 10. The lower ends of the sashes are also pivotally carried in the hanging slippers 6. The slippers 6 and 11 (and therefore also the sashes) are slidable vertically in grooves in the frame jamb, and the sashes work as ordinary sliding sashes, but fit without rattle as the setting of the slippers insures a neat working fit. When it is required to fold a sash inward, it is slid in the frame until the latch staples 12 are in register with the recesses 21 cut in the frame jambs; then the turn buttons 17 are freed, and the latch staples 12 are folded outward and snapped into the springs 22. The sash is now free to be folded inward about the pivots 8 set in the hanging slippers 6, and the cords are locked to the frame, and the counterweights rendered inactive. If a small ventilating opening only is required, the finger piece 24 is thrown over as shown in Fig. 11 and the lower sash rested against it, leaving a small gap horizontally between the lower and upper sashes.

The operation of the modified shape of locking staple shown in Fig. 15 is identical with the operation of the corresponding part shown in the earlier figures. When the catch plate 10 and the locking staple 12 are omitted and the sashes attached to the counterweight cords by the hanging slippers 6 only, their lower ends are held in alinement in the frame by those slippers while their upper ends are retained in the frame by the keepers 31. When the sash is slid in the frame until the offset pins 29 are in register with the transverse slots 30, and the keepers 31 lifted the sash may be swung out of the frame about its pivotal suspensions in the hanging slippers 6 which meanwhile have been fixed to the frame by inserting spikes 28 into them through the frame as indicated in Figs. 16 and 17.

What we claim as our invention and desire to secure by Letters Patent is:

1. A sliding and infolding sash window, embodying a window frame, a window sash slidable therein, sash cords for suspending said sash, means whereby the lower end of the sash is pivotally connected near one end of the sash cords, and means near the upper end of the sash whereby the latter may either be locked against pivotal movement in the frame or may be freed, at a predetermined position only of said sash for pivotal movement about said pivotal connection, while being locked against sliding movement in said frame.

2. A sliding and infolding sash window, embodying a grooved window frame, a window sash slidable therein, sash cords for suspending said sash, a slipper slidable in the groove in the frame and attached to one of said sash cords, a pivotal connection between said sash and said slipper, a second slipper slidable in said groove, and means whereby said second slipper may be locked either to the frame or to the sash.

3. A sliding and infolding sash window, embodying a grooved window frame, a window sash slidable therein, sash cords for suspending said sash, a slipper slidable in the groove in the frame and attached to one of said sash cords, a pivotal connection between said sash and said slipper, a second slipper attached to said sash cord and slidable in said groove, and a folding staple carried by said second slipper and attachable either to said frame or to said sash.

4. A sliding and infolding sash window, embodying a grooved window frame provided with recesses, a window sash slidable in said frame, sash cords for suspending said sash, a slipper slidable in the groove in the frame and attached to one of said sash cords, a pivotal connection between said sash and said slipper, a second slipper attached to said cord and slidable in said groove, and a folding staple carried by said second slipper and adapted to be either attached to said sash or moved into one of the recesses in the frame.

5. A sliding and infolding sash window, embodying a grooved window frame, a window sash provided with a recess therein and slidable in said frame, sash cords for suspending said sash, a slipper slidable in the groove in the frame and attached to one of said cords, a pivotal connection between said sash and said slipper, a second slipper attached to said sash cord and slidable in said groove, a catch plate carried by said second slipper, and means whereby said catch plate may either be locked in the recess in the window sash or locked to said frame.

6. A sliding and infolding sash window, embodying a grooved window frame, a window sash provided with a lateral recess of dovetail form and slidable in the frame, sash cords for suspending said sash, a slipper slidable in the groove in the frame and attached to one of said cords, a pivotal connection between said sash and said slipper, a second slipper attached to said cord and slidable in said groove, a catch plate of dovetail form carried by said second slipper, and means whereby said catch plate may either be locked in the recess in the sash to prevent pivotal movement of the latter, or may be locked to said frame to permit pivotal movement of the sash but prevent sliding movement thereof.

7. A sliding and infolding sash window, embodying a grooved window frame, a window sash slidable therein, sash cords for suspending said sash, a pair of slippers slidable in the groove in the frame and attached at different points to each of said sash cords, a permanent pivotal connection between one end of the sash and one of said slippers, and a releasable connection between the other end of the sash and the other slipper.

8. A sliding and infolding sash window, embodying a grooved window frame, a window sash slidable therein, sash cords for suspending said sash, a pair of slippers slidable in the groove in the frame and attached at different points to each of said sash cords, a permanent pivotal connection between one end of the sash and one of said slippers, a releasable connection between the other end of the sash and the other slipper, and a folding staple by means of which said last named slipper may be locked either to the sash or to the window frame.

9. A sliding and infolding sash window, embodying a grooved window frame, a window sash slidable therein, sash cords for suspending said sash, a slipper attached to one of said sash cords and slidable in the groove in the frame, a plate adjustable in said sash and having a projecting trunnion pin adapted to engage said slipper and form a pivot on which said sash swings, and means whereby pivotal movement of said sash is prevented, except when the same is in a predetermined position relatively to the frame.

10. A sliding and infolding sash window, embodying a grooved window frame having recesses in its outer face, a window sash slidable in said frame and provided with a transverse recess in its lateral face, sash cords for suspending said sash, a slipper slidable in the groove in the frame and attached to the lower end of one of the sash cords, a plate rotatably mounted near one end of the sash and having an eccentric pin projecting into said slipper, a second slipper adjustably secured to said sash cord and slidable in said groove, a catch plate carried by said second slipper, and an elbowed locking staple pivoted to said catch plate and adapted either to engage in one of the recesses in the frame or to engage said window sash.

In testimony whereof we have affixed our signatures in presence of two witnesses.

BENJAMIN JOSEPH BROWNJOHN.
THOMAS JAMES DENNY.

Witnesses:
W. J. DAVIS,
S. BECK.

Copies of this patent may be obtained for five cents each, by addressing the "Commissioner of Patents, Washington, D. C."